Dec. 5, 1944. H. J. DE N. McCOLLUM 2,364,457
HEATING SYSTEM
Filed Feb. 3, 1941
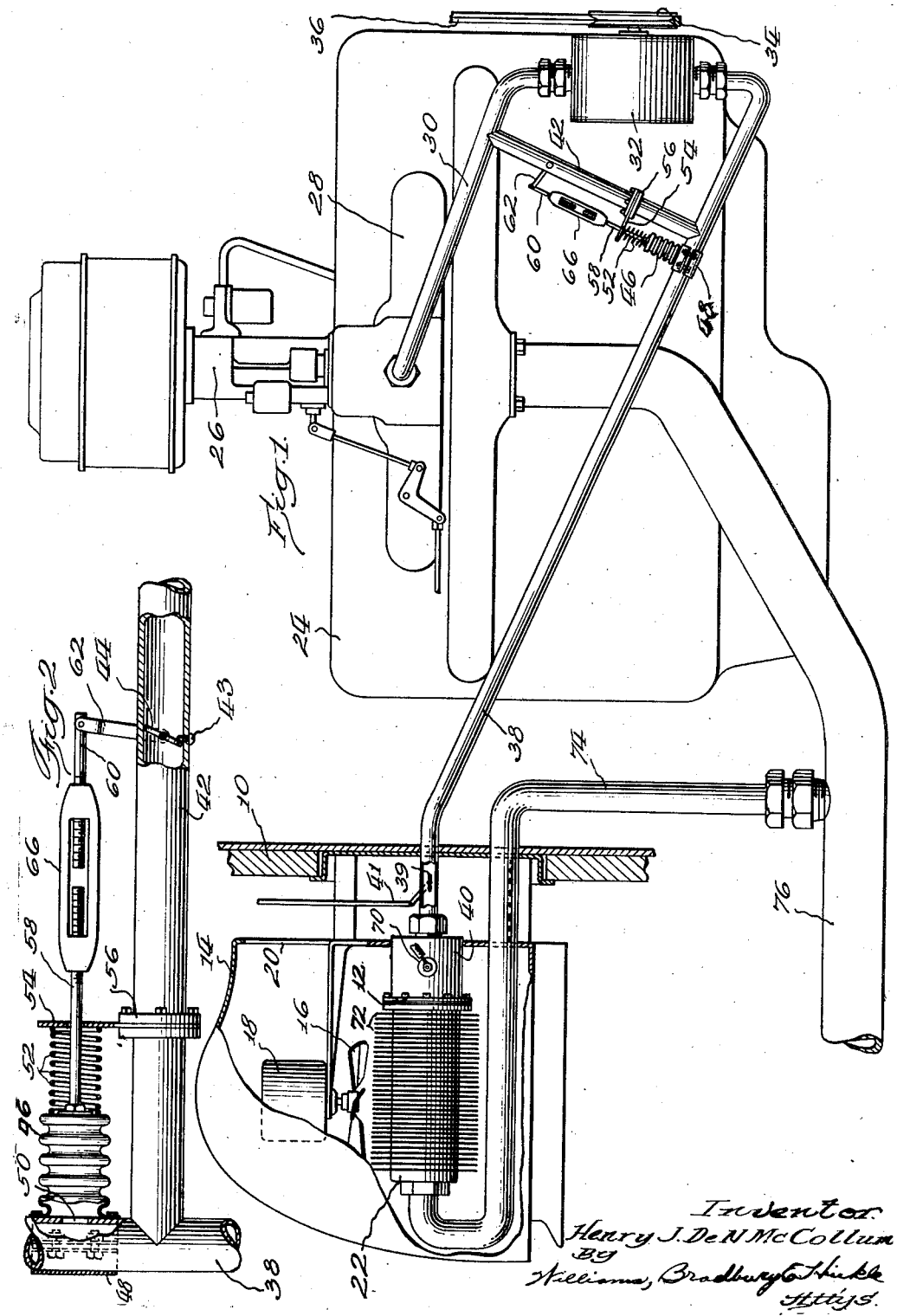

Patented Dec. 5, 1944

2,364,457

UNITED STATES PATENT OFFICE 2,364,457

HEATING SYSTEM

Henry J. De N. McCollum, Chicago, Ill.

Application February 3, 1941, Serial No. 377,183

5 Claims. (Cl. 237—12.3)

My invention relates generally to heating systems, and more particularly to an improved internal combustion heating system for use in heating large vehicles powered by internal combustion engines, such as busses, trucks, and the like.

An object of my invention is to provide an improved internal combustion heating system, which is stable and silent in its operation, and which derives its heat from the burning of a combustible mixture of liquid fuel and air supplied from the intake manifold of an internal combustion engine.

Another object is to provide an internal combustion heating system for large conveyances powered by internal combustion engines, which delivers a uniform quantity of heat under all conditions of engine operation.

A further object of my invention is to provide an internal combustion heating system, for use in connection with an internal combustion engine, which does not affect the operation of the engine.

A further object is to provide an internal combustion heating system, for the heating of busses and the like, with an improved automatic control which may be adjusted to deliver combustible mixture to the heater at a desired rate, and which maintains this rate substantially constant under all conditions of engine operation.

Other objects will appear from the following description, reference being had to the accompanying drawing in which:

Fig. 1 is a diagrammatic representation of my improved heating apparatus installed in a passenger bus, and Fig. 2 shows in partial cross-section the improved automatic controls for use in connection with the heating system shown in Fig. 1.

Referring to Fig. 1, the heating system comprises an internal combustion heater installed on the dashboard 10 of the vehicle to be heated. The heater comprises an internal combustion heating unit 12, which may be of the general type disclosed in my copending application Serial No. 378,262, filed February 10, 1941, enclosed within a shell 14. A fan 16, operated by an electric motor 18, is positioned to draw air from the passenger compartment through an opening 20 in the shell 14 and force it downwardly, past the finned heat exchanger 22 of the heating unit 12, through an opening in the bottom of the shell 14, to the passenger compartment.

The internal combustion engine 24 receives its combustible mixture from its carburetor 26 through an engine intake manifold 28. A conduit 30 connects the engine intake manifold 28 with a positive displacement pump 32 which is preferably a Roots or cycloidal type blower. The pump 32 is shown as being driven by a pulley 34 engaging the fan belt 36 of the engine. The pulley 34 may be replaced by a gear which engages the cam shaft gearing of the engine, or the pump 32 may be driven by a separate electric motor or other suitable means. A conduit 38 connects the outlet of the pump 32 with the inlet of the combustion chamber 40 of the heating unit 12.

A by-pass conduit 42 affords direct communication between the conduits 30 and 38. As is shown more clearly in Fig. 2, this conduit 42 has a butterfly valve 44 therein to regulate the rate of flow therethrough. The valve 44 is actuated by a differential pressure bellows 46 which is responsive to the difference in pressure between the inside of the conduit 38 and the atmosphere to maintain a pressure differential in the order of one or two inches of mercury. The open end of the bellows is sealed to the conduit 38 by a suitable clamp fitting 48, and a hole 50 in the conduit 34 affords communication between the interior of the conduit and the interior of the bellows. A spring 52, of suitable strength and elasticity, is held in compression between the movable end of the bellows and an abutment, which is shown as an apertured plate 54, retained by a flanged coupling 56 to the conduit 42. A threaded rod 58 is carried by the movable end of the bellows 46. A second threaded rod 60 is pivotally connected to a lever 62 which actuates the butterfly valve 44. A turnbuckle 66 is threaded over the ends of the rods 58 and 60 to connect these rods so that movement of the closed end of the bellows 46 actuates the valve 44. A small screw 43 is threaded through a hole in the conduit 42 to act as a stop and prevent the butterfly valve 44 from turning past its closed position, as is shown in Fig. 2.

The amount of combustible mixture supplied to the heating unit 12, and the amount of heat generated thereby, is substantially proportional to the difference in pressure between the inside of the conduit 38 and the atmosphere. The bellows 46 actuates the valve 44 to maintain the pressure in the conduit 38 at its desired value. As the pressure in the conduit 38 increases, the bellows 46 opens the valve 44, thereby allowing combustible mixture to flow from the conduit 38 to the inlet of the pump 32, relieving the pressure in the conduit 38. As the pressure in the conduit 38 decreases, the bellows 46 operates the valve 44 to decrease the rate of flow through the bypass conduit 42, causing the pressure in the conduit 38 to rise. When the valve 44 is open, combustible mixture flows from the outlet of the pump 32, through conduits 38, 42, and 30, to the inlet of the pump and the net amount of combustible mixture delivered to the combustion chamber 40 is decreased. However, when the valve 44 is closed, all of the combustible mixture delivered by the pump passes to the combustion chamber 40. The pressure in the conduit 38 and the resulting heat output of the heating unit 12 is thus maintained substantially constant although the speed of the pump and its intake vacuum may vary over wide ranges.

The turnbuckle 66 affords a convenient adjustment for controlling the pressure automatically maintained in the conduit 38. When the space to be heated is large, or the outside temperature is low, it will be desirable to maintain a relatively high pressure in the conduit 38 and thereby increase the amount of heat delivered by the heater. To raise the pressure automatically maintained in the conduit 38, the turnbuckle 66 is shortened. Assuming that the valve 44 is in its closed position as is shown in Fig. 2, shortening the turnbuckle will draw the closed end of the bellows 46 toward the lever 62 and thereby shorten or compress the spring 52. When the spring 52 is compressed, the bellows 46 must exert a greater force to overcome the compression of the spring 52 and open the valve 44 than when the spring 52 is extended. Conversely, when the turnbuckle 66 is lengthened, the spring 52 is correspondingly lengthened and a smaller force is necessary to overcome the resistance of the spring 52 and open the valve 44. Thus, it is seen that shortening the turnbuckle 66 causes the valve 44 to operate to maintain an increased pressure in the conduit 38 and this increased pressure results in a larger flow of combustible mixture to the heater and an increase in its heat output. Lengthening the turnbuckle 66 causes a decrease in the heat output.

In operation, combustible mixture is drawn from the engine intake manifold 28, through the conduit 30, into the pump 32 where it is compressed. The combustible mixture then passes from the outlet of the pump 32, through the conduit 38, into the combustion chamber 40 of the heating unit 12 where it is burned. A manually operable valve 39, actuated by a rod 41, may be provided to control the flow of combustible mixture to the conduit 38 and thereby control the operation of the heater. An electrically operated igniter 70 is provided to establish combustion in the combustion chamber 40. The gases of combustion from the combustion chamber 40 pass into the heat exchanger 22 and the heat is transmitted to the fins 72 which encircle the heat exchanger. The products of combustion are discharged from the heat exchanger 22, through an exhaust conduit 74, to a convenient point of discharge which is illustrated as being the exhaust pipe 76 of the internal combustion engine.

The electrically operated fan 16 draws air from the passenger compartment of the vehicle through an opening 20 in the heater casing 14, and forces the air past the surfaces of the fins 72 of the heat exchanger 22, heating the air. The heated air is then discharged through an opening in the bottom of the heat exchanger casing 14 into the passenger compartment.

If desired, the actuating rod 41 for the valve 39 may be connected with a heater control switch which controls the electrical energization of the igniter and fan circuits of the heater so that when the valve 39 is opened slightly, the switch is closed and the heater circuits energized, and when the valve 39 is closed the switch is opened. A thermostatic switch, such as that shown in my prior Patent No. 2,190,671, issued February 20, 1940, may be provided to control the energization of the igniter 70 and fan motor 18 so that closing the heater control switch energizes the igniter to establish combustion in the heater. When the temperature of the heating unit rises, the thermostatic switch energizes the motor circuit and starts the operation of the fan and, when the temperature of the heating unit 12 has risen to near its operating value, de-energizes the igniter.

Inasmuch as the vacuum in the intake manifold 28 of the engine 24 varies widely as the conditions of engine operation vary from idling to open throttle, the pump or blower 32 is preferably of a positive displacement type such as a cycloidal blower. A positive displacement pump will deliver a substantial quantity of combustible mixture although its inlet may operate at a very low pressure, inasmuch as it displaces a given volume of combustible mixture under all conditions of operation. A centrifugal pump operating at any given speed creates a differential pressure directly proportional to the density of the material upon which it acts, and if it were used to pump a rarified combustible mixture the net output of the pump would be very small. However, a positive displacement pump will deliver a substantial quantity of combustible mixture under any conditions of operation which may be encountered in practice.

It would be possible to replace the automatically controlled by-pass arrangement with an automatically regulated valve in conduit 30, but if this were done the pressure differential across the pump 32 would be materially increased at low outputs, with resulting increase in the power consumed by the pump. Another possible alternative arrangement would be to decrease the size of the by-pass 42 and place an automatically controlled valve in the conduit 38 between the inlet of the by-pass 42 and the heater. However, an arrangement of this sort would also materially increase the power consumed by the pump. Also, at high vacuums in the intake manifold 28, when the load upon the pump is greatest, a large part of the combustible mixture passing through the pump 32 would pass through the by-pass and back to the conduit 30.

While I have described my invention in connection with a preferred embodiment thereof, it will be obvious to those skilled in the art that numerous modifications may be made without departing from the underlying principles thereof. Therefore, I wish to include in the following claims all such modifications of my invention by which substantially the same results may be attained by substantially the same or equivalent means.

I claim:

1. In a heating system for use in conjunction with an internal combustion engine having a carburetor for mixing fuel and air to form a combustible mixture, the combination of an internal combustion heating unit, a positive displacement pump having an inlet and an outlet, means for actuating said pump, means forming a passage for supplying combustible mixture from said carburetor to said inlet, means forming a passage for supplying combustible mixture from said outlet to said heater, a by-pass conduit affording communication between said inlet and said outlet, a valve therein for controlling the rate of flow therethrough, means responsive to the pressure at the outlet of said pump to operate said valve, and means for conducting the products of combustion from said heating unit.

2. In a heating system for use in conjunction with an internal combustion engine having a carburetor for mixing fuel and air to form a combustible mixture, the combination of an internal combustion heating unit, a positive displacement pump having an inlet and an outlet, means for actuating said pump, means forming a passage for supplying combustible mixture from said carburetor to said inlet, means forming a second passage for supplying combustible mixture from said outlet to said heating unit, means forming a bypass passage affording communication between said outlet and said inlet valve in said by-pass, means responsive to the difference in pressure between said second passage and the atmosphere, said pressure responsive means being adapted to actuate said valve for regulating the rate of flow of combustible mixture through said by-pass, and means for conducting the products of combustion from said heating unit.

3. In a heating system for use in connection with an internal combustion engine having a carburetor for mixing fuel and air to form a combustible mixture, the combination of an internal combustion heating unit adapted to generate heat by the burning of said combustible mixture, a positive displacement pump having an inlet and an outlet, means for actuating said pump, a conduit for conducting combustible mixture from said carburetor to said inlet, a second conduit for supplying combustible mixture from said outlet to said heater, means for conducting the products of combustion from said heater, means forming a by-pass passage affording communication between the outlet and the inlet of said pump, a valve in said by-pass passage for regulating the rate of flow therethrough, and means responsive to the pressure within said second conduit adapted to regulate said valve to increase said rate of flow through said by-pass when the pressure in said second conduit rises above the desired value, and to decrease said rate of flow when said pressure falls below said value.

4. In a heating system for use in conjunction with an internal combustion engine having a carburetor for mixing fuel and air to form a combustible mixture, the combination of an internal combustion heating unit adapted to generate heat by burning said combustible mixture, a positive displacement pump having an inlet and an outlet, means for driving said pump from said engine, means forming a passage for conducting combustible mixture from said carburetor to said inlet, means forming a second passage for conducting combustible mixture from said outlet to said heating unit, means for conducting the products of combustion from said heating unit, means forming a by-pass passage affording communication between said inlet and said outlet, a valve in said by-pass, means responsive to the pressure in said second conduit to regulate said valve to increase the rate of flow through said by-pass when said pressure increases and to decrease said rate of flow when said pressure decreases, and means for adjusting said pressure responsive means to maintain said pressure at the desired value.

5. In a heating system for heating the passenger compartment of an automotive vehicle driven by an internal combustion engine and having an intake manifold for supplying a combustible mixture to the engine, the combination of an internal combustion type heater, a positive displacement pump for withdrawing combustible mixture from the intake manifold of the engine and supplying it to said heater, means for conveying the products of combustion from said heater, and adjustable means responsive to the pressure at which the combustible mixture is supplied to said heater to bypass combustible mixture from the discharge side of said pump to the inlet side thereof, whereby the pressure at which the combustible mixture is forced to said heater is maintained at a substantially constant value for a particular adjustment of said adjustable means.

HENRY J. DE N. McCOLLUM.